US012738015B2

United States Patent
(12) United States Patent
Ding et al.

(10) Patent No.: US 12,738,015 B2
(45) Date of Patent: Sep. 15, 2026

(54) COAL FLOW IDENTIFICATION METHOD BASED ON BACKGROUND SUBTRACTION ALGORITHM

(71) Applicant: Taiyuan University of Technology, Taiyuan (CN)

(72) Inventors: Hua Ding, Taiyuan (CN); Guangyu Zheng, Taiyuan (CN); Zheqian Zhao, Taiyuan (CN); Junhu Zhang, Taiyuan (CN); Junjun Zhao, Taiyuan (CN); Bao Wang, Taiyuan (CN); Tianyu Zhang, Taiyuan (CN); Kun Yang, Taiyuan (CN); Jiacheng Xie, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 234 days.

(21) Appl. No.: 18/808,474

(22) Filed: Aug. 19, 2024

(65) Prior Publication Data

US 2025/0245955 A1 Jul. 31, 2025

(30) Foreign Application Priority Data

Jan. 26, 2024 (CN) ........................ 202410111778.3

(51) Int. Cl.

| | |
|---|---|
| ***G06V 10/26*** | (2022.01) |
| ***G06V 10/12*** | (2022.01) |
| ***G06V 10/25*** | (2022.01) |
| ***G06V 10/44*** | (2022.01) |
| ***G06V 10/74*** | (2022.01) |
| ***G06V 20/40*** | (2022.01) |
| ***G06V 20/50*** | (2022.01) |

(52) U.S. Cl.
CPC ........... *G06V 10/273* (2022.01); *G06V 10/12* (2022.01); *G06V 10/25* (2022.01); *G06V 10/44* (2022.01); *G06V 10/761* (2022.01); *G06V 20/40* (2022.01); *G06V 20/50* (2022.01)

(58) Field of Classification Search
CPC ...... G06V 10/273; G06V 10/12; G06V 10/25; G06V 10/44; G06V 10/761; G06V 20/40; G06V 20/50; G06V 20/10; G06V 10/267; G06V 10/30; G06V 10/34
See application file for complete search history.

(56) References Cited

FOREIGN PATENT DOCUMENTS

CN 112396623 A * 2/2021 ........... G06V 10/267

* cited by examiner

*Primary Examiner* — Edward Park
*Assistant Examiner* — Alexander Joseph Vaughn
(74) *Attorney, Agent, or Firm* — Cozen O'Connor

(57) ABSTRACT

A coal flow identification method based on a background subtraction algorithm, including: S1: simultaneously capturing images of a coal layer at a coal unloading end of a scraper conveyor using a plurality of cameras mounted on a reversed loader in parallel; S2: determining an optimal sequence image of simultaneously captured three sequence images, and delimiting a region of interest; S3: extracting a motion region outline in the image; S4: performing line adding repair on the motion region outline, and padding the repaired motion region outline; S5: calculating a number of pixels in a motion region, and calculating an area of the motion region according to a scale; and S6: calculating a coal flow volume.

10 Claims, 2 Drawing Sheets

COAL FLOW IDENTIFICATION METHOD BASED ON BACKGROUND SUBTRACTION ALGORITHM

CROSS REFERENCE TO RELATED APPLICATION

This patent application claims the benefit and priority of Chinese Patent Application No. 202410111778.3, filed with the China National Intellectual Property Administration on Jan. 26, 2024, the disclosure of which is incorporated by reference herein in its entirety as part of the present application.

TECHNICAL FIELD

The present disclosure belongs to the technical field of visual coal flow identification of scraper conveyors, and in particular, to a coal flow identification method based on a background subtraction algorithm.

BACKGROUND

A scraper conveyor is the most crucial equipment in a main mine transport system. Due to the "beginning" of transport, increasing an intelligent level of the scraper conveyor is of great significance for increasing an overall energy utilization ratio of coal mining, reducing a mining cost, and guaranteeing safe production. The accuracy of intelligent data measurement of the transport system guarantees subsequent intelligent speed regulation and control of the production equipment to achieve intelligent production. Therefore, it is of great significance to realize coal flow metering on the scraper conveyor.

At present, coal flow detection is mainly carried out on a belt conveyor after crushing, and a contact measurement mode such as using an electronic belt scale is often employed. For the scraper conveyor, the existing detection method and detection manner cannot adapt to operating conditions of the scraper conveyor.

Therefore, a coal flow identification method based on a background subtraction algorithm is proposed. After video sequence frames captured by a camera are preprocessed, cross section information of a coal flow layer is extracted by using methods such as region-of-interest delimiting and background subtraction. A scale is then obtained by image calibration such that area information is obtained by calculation, whereby coal flow information is obtained. Non-contact measurement of the coal flow information on the scraper conveyor can be realized, providing data support for smart production.

SUMMARY

To solve the above-mentioned problems, the present disclosure provides a coal flow identification method based on a background subtraction algorithm.

The present disclosure adopts the following technical solutions: a coal flow identification method based on a background subtraction algorithm includes:

S1: simultaneously capturing images of a coal layer at a coal unloading end of a scraper conveyor using a plurality of cameras mounted on a reversed loader in parallel;

S2: determining an optimal sequence image of simultaneously captured three sequence images, and delimiting a region of interest;

S3: extracting a motion region outline in the image;

S4: performing line adding repair on the motion region outline, and padding the repaired motion region outline;

S5: calculating a number of pixels in a motion region, and calculating an area of the motion region according to a scale; and S6: calculating a coal flow volume.

In step S1, three cameras may be mounted in parallel on a sidewall of the coal unloading end of the scraper conveyor, and angles of the cameras may be adjusted such that the cameras are located above a horizontal plane of the coal layer of the scraper conveyor.

Step S2 may include:

S21: selecting an image of an ideal location area at the coal unloading end of the scraper conveyor as a predefined template t[m, n];

S22: calculating similarities of images $G_1[x,y]$, $G_2[x,y]$, and $G_3[x,y]$ captured by the three cameras at a same time with the predefined template t[m, n] to obtain and output a similarity matrix R[x−m+1, y−n+1]; and S23: segmenting a region having a maximum similarity in the three images or a region represented by a point of a maximum of the similarity matrix, and setting the region as the region of interest.

Step S3 may include:

S31: performing edge recognition on an image of the region of interest extracted in S2;

S32: performing a subtraction operation on a current image frame and a background mask, and delimiting the motion region outline; and S33: performing the subtraction operation on the delimited motion region outline of a current frame and the current image frame to obtain a new background mask, where the new background mask is used for delimiting the motion region outline in next image frame.

Step S4 may include:

S41: with a few of noisy points existing outside the motion region outline delimited in S3, performing Gaussian filtering and median filtering on the image;

S42: performing broken line repair on a motion region image in case that the processed motion region outline has a broken outline; and S43: padding an interior of the motion region outline.

Step S5 may include:

S51: selecting a scraper on the scraper conveyor in a no-load state as a reference object, measuring a number Mc of pixels and an actual size Nc of the scraper, and calculating a scale $$Kc = \frac{Nc}{Mc};$$

S52: calculating a number of pixels of the motion region padded in S4; and

S53: converting the number of pixels to a real cross-sectional area according to the scale.

In step S52, an average value of numbers of pixels of motion regions of five consecutive image frames may be used as the number of pixels of the motion region.

Step S6 may include:

S61: calculating an instantaneous chain speed according to an instantaneous speed and a radius of a chain sprocket of the scraper conveyor;

S62: calculating an instantaneous coal flow volume according to the instantaneous chain speed; and S63: calculating a coal flow volume within an hour according to the instantaneous coal flow volume.

In step S61, a speed value of a head sprocket of the scraper conveyor at an i th second may be averagely divided into six segments, which correspond to numbers of pixels of six motion regions within the ith second, denoted by $\omega_{i1}$, $\omega_{i2}$, $\omega_{i3}$, $\omega_{i4}$, $\omega_{i5}$, and $\omega_{i6}$; the radius of the sprocket is denoted by r; the instantaneous chain speed is denoted by $qi=\omega_i \times r$; and chain speeds at the ith second are denoted by $q_{i1}$, $q_{i2}$, $q_{i3}$, $q_{i4}$, $q_{i5}$, and $q_{i6}$.

In step S62, the instantaneous coal flow volume is denoted by $$V_i = \frac{1}{6} Kc \sum_{j=1}^{6} N_{ij} q_{ij},$$

where Vi represents a coal flow volume at the ith second; Kc represents the scale; and $N_{ij}$ and $q_{ij}$ represent a number j of pixels and a chain speed j at the ith second, respectively.

In step S63, the coal flow volume within an hour is denoted by $$V_{1h} = \sum_{i=1}^{3600} V_i - V_C,$$

where $V_i$ represents the coal flow volume at the ith second; and Vc represents a no-load volume in an hour.

Compared with the prior art, the present disclosure proposes a coal flow identification method based on a background subtraction algorithm to address the problems of complex working conditions, great vibration shock, and high coal flow statistical difficulty of the scraper conveyor on a fully mechanized coal mining face. The coal flow identification method based on a background subtraction algorithm includes: firstly, region-of-interest delimiting is performed on image data captured by a camera, and smoothing is performed using a Gaussian filter; secondly, a background subtraction algorithm model is established to complete motion region delimiting and extract dynamic pixels; subsequently, the captured image data is processed using a median filter; next, a number of pixels is calculated according to a scale obtained by image calibration, and then cross-sectional information of a coal flow layer in unit time is obtained; and finally, a coal flow volume is calculated according to the cross section information and chain speed information of the scraper conveyor. The method can not only extract coal layer surface information using the background subtraction algorithm, but also process the coal layer surface information using the Gaussian filter and the median filter to reduce interference of dust with statistics. The coal flow identification method provided by the present disclosure can be used to obtain the coal flow information on the scraper conveyor and is applicable to actual mining in a mine.

DETAILED DESCRIPTION OF THE EMBODIMENTS

The present disclosure is described in detail below with reference to specific embodiments. The following embodiments will help those skilled in the art to further understand the present disclosure, but do not limit the present disclosure in any way. It should be noted that several variations and improvements can also be made by a person of ordinary skill in the art without departing from the conception of the present disclosure. These all fall within the protection scope of the present disclosure.

Figure 1:
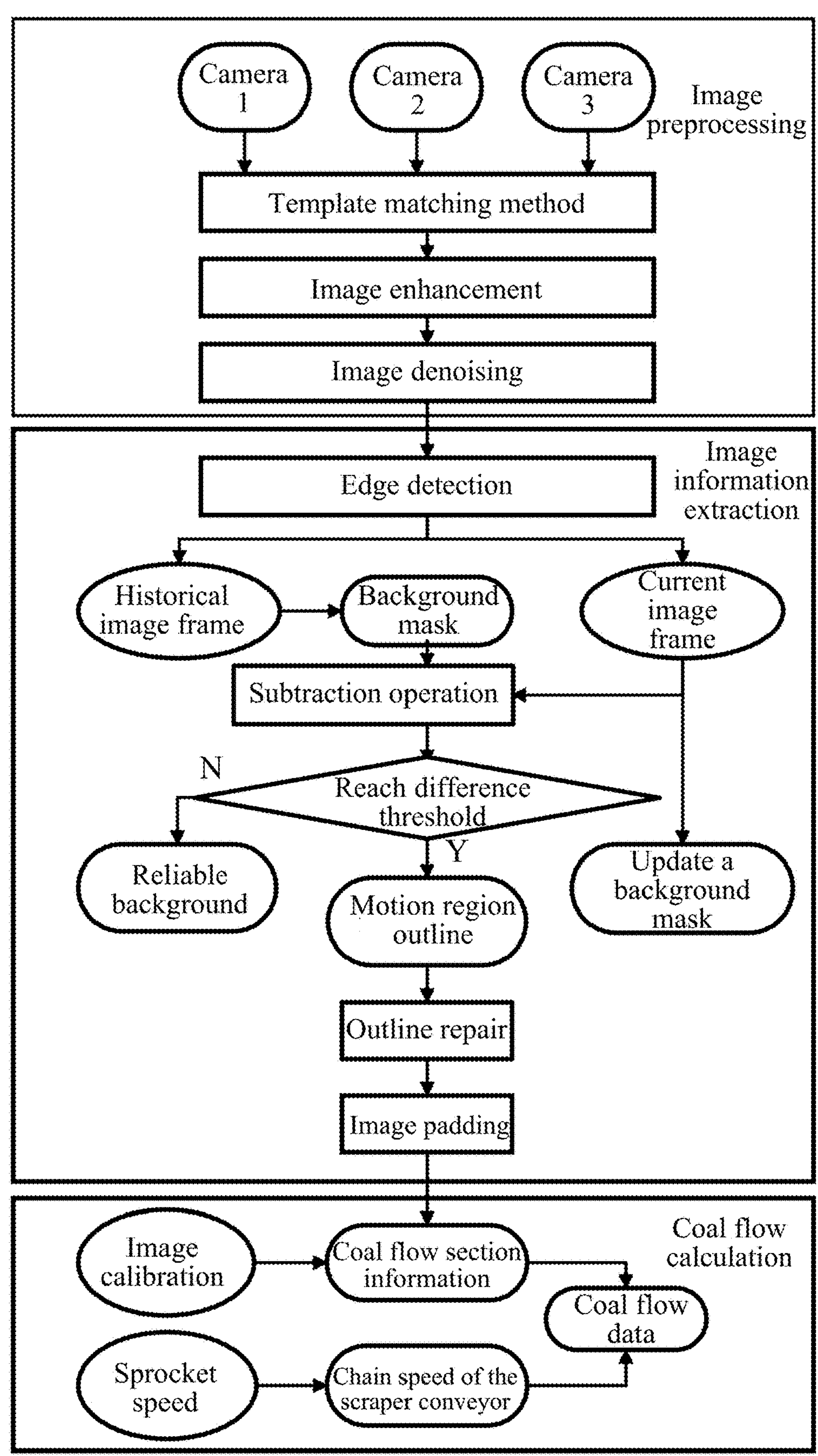
FIG. 1 is a flowchart of a coal flow identification method based on a background subtraction algorithm provided by the present disclosure.

With reference to FIG. 1, an embodiment discloses a coal flow identification method based on a background subtraction algorithm. The following steps are included: firstly, template matching is performed on sequence images simultaneously input by three cameras mounted in parallel to determine an optimal input sequence image, and a region of interest is delimited, and then the delimited image is subjected to image enhancement and image denoising; secondly, edge detection is performed on the image, and then a motion region is delimited by the background subtraction algorithm and padded; and finally, a coal flow volume is calculated according to a chain sprocket speed of a scraper conveyor.

This method, by using template matching and the background subtraction algorithm, can not only select an optimal sequence image from a plurality of sequence images but also extract coal layer surface information in the image. The coal flow identification method provided by the present disclosure can be used to obtain the coal flow information on the scraper conveyor and is applicable to actual mining in a mine. A detailed description is made below. The following steps are mainly included.

Figure 2:
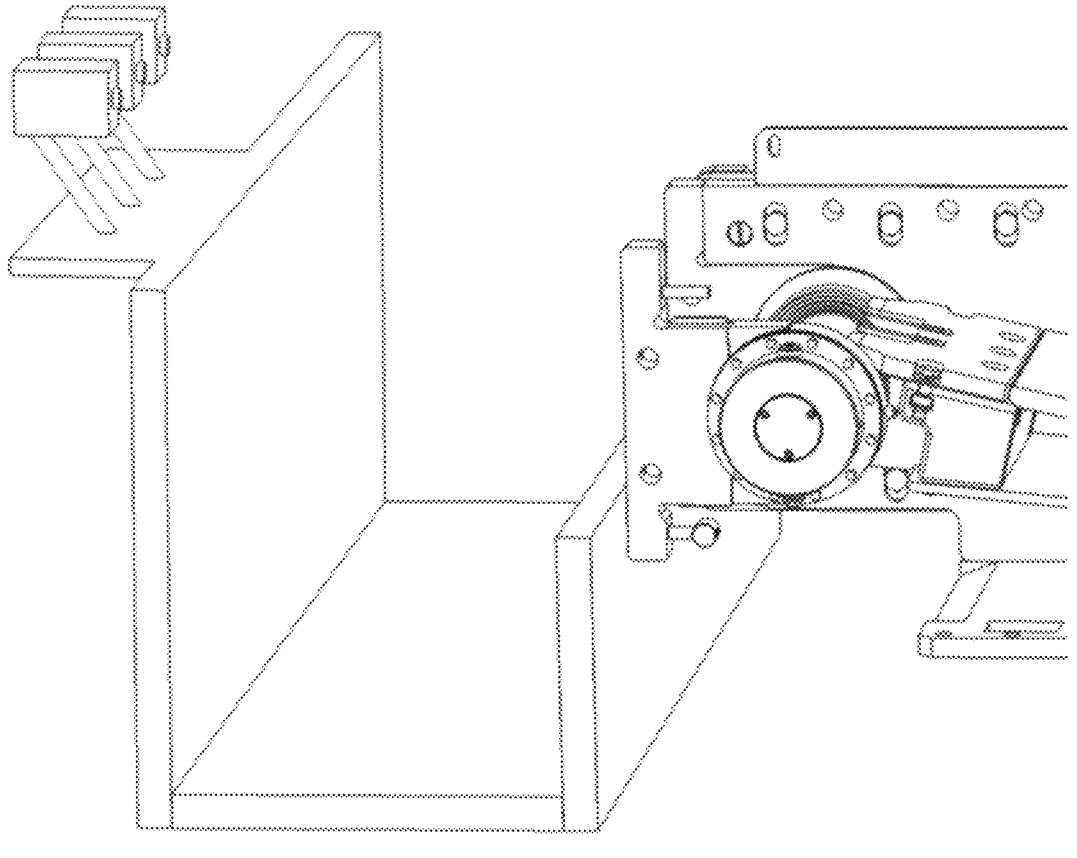
FIG. 2 is a schematic diagram of a mounting position of a device.

S1: as shown in the schematic diagram of a device of FIG. 2, cameras are mounted at symmetrical positions of a coal unloading opening of a scraper conveyor on a loader. To avoid coal pieces and large pieces of gangue from hitting against sensor devices, camera brackets may be arranged on an outer side of a body of the loader.

S2: due to a relative displacement between a reversed loader and the scraper conveyor during working, the cameras cannot completely capture coal flow images at a coal unloading end, which may affect the accuracy of coal flow identification. Moreover, a region of interest is delimited to effectively increase an overall operation speed of the algorithm. A template matching method is used to determine an image and delimit the region of interest.

An operation process of the template matching method is as follows.

Firstly, an ideal processing region at the coal unloading end of the scraper conveyor is selected as a predefined template input; the predefined template is greyed; and a two-dimensional matrix t[m, n] is used to represent a predefined template grey-scale map. In the two-dimensional matrix, m and n represent the predefined template grey-scale map of columns m and n, m, $n \in (0,255)$.

Secondly, three images captured by three cameras are greyed, and the processed grey-scale maps are represented by $G_1[x,y]$, $G_2[x,y]$, and $G_3[x,y]$, respectively. In the matrices $G_1[x,y]$, $G_2[x,y]$, and $G_3[x,y]$, t[m,n] is shifted, and a similarity between the predefined template and an overlaying image to obtain a similarity matrix R[x−m+1, y−n+1]. An optimal position matching the predefined template is obtained according to the similarity matrix.

Image at the optimal position and having a same size with the predefined template is set as the region of interest.

S3: a motion region outline in the image is extracted using edge detection and the background subtraction algorithm.

Step S3 further includes the following steps.

S31: edge detection is performed on the image of the region of interest determined in S2; the probability of an edge is determined using an amplitude of a gradient in the image, i.e., $$\|\nabla f\| = \sqrt{\left(\frac{\partial f}{\partial x}\right)^2 + \left(\frac{\partial f}{\partial y}\right)^2},$$

and the amplitude is positively correlated to the probability of the edge; a threshold is selected according to the environment of the scraper conveyor for determination.

S32: an image mask refers to a selected image occluding a partial image to be processed so as to control a region of the image to be processed. A background mask refers to occluding a static background not varying in the image of the coal unloading end of the scraper conveyor for delimiting a moving coal material image. Background subtraction calculation is performed on the image after region delimiting. A change in pixels at same positions in consecutive image frames is analyzed and compared; pixels remaining unchanged for a long time are regarded as a reliable background, and a background mask is generated. The background mask is denoted by B(x,y), and a current frame is denoted by $f_n(x,y)$.

A subtraction operation is performed on an image frame acquired currently and the background mask to obtain an image $D_n(x,y)=|f_n(x,y)-B(x,y)|$ after subtraction. A threshold T is set; pixels are binarized one by one to obtain a binary image $R_n(x,y)$, where a value of a moving point is set to 255, and a value of the static background is 0, $$R_n(x, y) = \begin{cases} 255, & D_n(x, y) > T \\ 0, & \text{else} \end{cases}.$$

S33: the background mask is updated according to the current image frame.

S4: line adding repair is performed on the motion region outline, and the repaired motion region outline is padded.

S41: with a few of noisy points existing outside the motion region outline delimited in S3, Gaussian filtering and median filtering are performed on the image.

A lot of salt-and-pepper noise exists in the image acquired at this time, which may affect the calculation of a number of pixels. To avoid this phenomenon, processing by a median filter is needed. The median filter is a nonlinear signal processing method, which is suitable for eliminating the salt-and-pepper noise. After a current pixel and adjacent pixels are ranked, a value of the pixel in the middle position is taken as the value of the current pixel.

Gaussian noise refers to a type of noise of which a probability density distribution complies with Gaussian distribution, i.e., meets:

$$f(x) = \frac{1}{\sqrt{2\pi\sigma}}\exp\left(-\frac{(x-u)^2}{2\sigma^2}\right)$$

where u refers to a Gaussian distribution expectation, and $\sigma^2$ represents a Gaussian distribution variance.

A Gaussian filter is a linear smoothing signal processing method, which is suitable for eliminating Gaussian noise. A value of a current pixel is obtained by performing weighted averaging on values of the current pixel itself and other pixels in a neighborhood.

Taking as an example a size of 3×3 convolution kernel, σ=1, sampling is performed from the current pixel as a center point. Coordinates of positions are as shown in the following figure (the x-axis is horizontally rightwards, and the y-axis is vertically downwards).

| | | |
|---|---|---|
| (−1, 1) | (0, 1) | (1, 1) |
| (−1, 0) | (0, 0) | (1, 0) |
| (−1, 1) | (0, −1) | (1, −1) |

After being substituted into calculation and then normalized, a convolutional kernel can be obtained

| | | |
|---|---|---|
| 0.075 | 0.124 | 0.075 |
| 0.124 | 0.204 | 0.124 |
| 0.075 | 0.124 | 0.075 |

Convolution calculation is performed according to the determined convolution kernel. An abrupt change in intensity between pixels relative to a truth value can be reduced, and the image can be smoothed.

$$f(x, y) = \frac{1}{\sqrt{2\pi\sigma}}\exp\left(-\frac{(x^2+y^2)}{2\sigma^2}\right)$$

As can be known from the above Gaussian function, when σ is smaller, a center coefficient of a template is greater, a periphery coefficient is smaller, and the smoothing effect of image processing is weaker. Conversely, when σ is greater, the image smoothing effect is stronger, but image blurring may be caused. Therefore, the value of σ may be appropriately adjusted according to the environmental noise. After noise processing, "voids" may be created in the surface of the coal material such that a measurement result is too low. To avoid the influence, an opening operation needs to be performed. The opening operation refers to an expansion operation performed after a corrosion operation. While noise can be further removed, the missing of the coal material surface is padded.

S42: broken line repair is performed on a motion region image in case that the processed motion region outline has a broken outline.

S43: the cross-sectional outline of the coal material has been enclosed after the background subtraction calculation and the line repair operation. The enclosed region is padded, and a padded region represents a cross-sectional area of the current image frame of the coal material.

S5: an image measurement size for the coal material in coal flow identification is in units of pixels. Pixels are affected by an acquisition system to change, and therefore, the size needs to be converted such that the image measurement size is converted to a real size.

Step S5 further includes the following steps.

S51: a scraper on the scraper conveyor in a no-load state is selected as a reference object, a number Mc of pixels and an actual size Nc of the scraper are measured, and a scale $$Kc = \frac{Nc}{Mc}$$

is calculated.

Specifically, image calibration is performed. The scraper on the scraper conveyor in the no-load state is selected as the reference object; the number of pixels of the scraper is measured as Mc=8692, and the actual size is measured as $Nc=6.05\times10^{-3}$ $m^2$; and the scale is obtained as $$Kc = \frac{Nc}{Mc} = \frac{6.05\times10^{-3}}{8692}.$$

S52: a number of pixels of the motion region padded in S4 is calculated.

S53: the number of pixels is converted to a real cross-sectional area according to the scale.

Due to different performance of the cameras, frames obtained in a second may be different, taking 30 fps input images as an example. Numbers $N'_{i1}$, $N'_{i2}$, $N'_{i3}$, . . . , $N'_{i30}$, of pixels of the motion regions in consecutive image frames at the ith second are calculated.

An average value of numbers of pixels of motion regions of five consecutive image frames is obtained, and six numbers of pixels within the ith second are $N_{i1}$, $N_{i2}$, $N_{i3}$, $N_{i4}$, $N_{i5}$, $N_{i6}$.

Due to harsh working environment of the scraper conveyor, the images captured by the cameras may be easily disturbed by flying pulverized coal, leading to a large measurement error. Therefore, taking a camera capable of capturing 30 images per second as an example, the average value of the numbers of pixels of the motion regions of the five consecutive image frames is used as ⅙ numbers of pixels. An abrupt increase in the number of pixels caused by the flying pulverized coal can be reduced.

S6: a coal flow volume is calculated according to a chain speed $V_{ij}$ of the scraper conveyor.

Step S6 further includes the following steps.

S61: a speed value of a head sprocket of the scraper conveyor at an ith second is averagely divided into six segments, which correspond to numbers of pixels of six motion regions within the ith second, denoted by $\omega_{i1}$, $\omega_{i2}$, $\omega_{i3}$, $\omega_{i4}$, $\omega_{i5}$, and $\omega_{i6}$; the radius of the sprocket is denoted by r; the instantaneous chain speed is denoted by $qi=\omega_i\times r$; and chain speeds at the ith second are denoted by $q_{i1}$, $q_{i2}$, $q_{i3}$, $q_{i4}$, $q_{i5}$, and $q_{i6}$.

S62: the instantaneous coal flow volume at the ith second is denoted by $$V_i = \frac{1}{6}Kc\sum_{j=1}^{6} N_{ij}q_{ij},$$

where Vi represents a coal flow volume at the ith second; Kc represents the scale; and $N_{ij}$ and $q_{ij}$ represent a number j of pixels and a chain speed j at the ith second, respectively.

The scraper conveyor uses a chain and a scraper fixed to the chain as traction members. A chain sprocket on a head shaft rotates such that a scraper chain runs cyclically to drive the coal material to move along a gate road. In case of no coal flow or a small coal flow, a scraper blade performs an infinite closed cyclic motion, which would undoubtedly result in taking the volume of the scraper as the coal material for calculation in coal flow identification. Therefore, when the coal flow volume is calculated, this volume needs to be subtracted. Before the coal flow is measured, the scraper conveyor is allowed to run with no load for a period of time, and at this time, the volume information of the scraper of the scraper conveyor in the no-load state is obtained. When the actual coal flow information is measured, this piece of flow information generated by the motion of the scraper should be subtracted. The no-load volume in an hour is measured as Vc.

S63: the coal flow volume within an hour is denoted by $$V_{1h} = \sum_{i=1}^{3600} V_i - V_C,$$

where Vi represents the coal flow volume at the ith second; and Vc represents a no-load volume in an hour.

The main principle of the present disclosure is as follows: firstly, coal flow video data is captured by cameras arranged in place; the coal flow data is imported to a model for region delimiting and denoising; subtraction is performed on a current image frame of a video sequence and a background mask acquired in real time using the background subtraction algorithm; a pixel region having a difference to a background model reaching a threshold is used as a motion region; a size of the motion region is calculated; and a scale is obtained by image calibration using a block having a known size. A cross-sectional area of an instantaneous coal flow layer may be obtained using the scale and the number of pixels of the motion region. Due to the influences of the principle of the algorithm and the principle of the scraper conveyor, a volume variation caused by the motion of the scraper on the scraper conveyor in the no-load state needs to be subtracted from the obtained volume.

The specific embodiments of the present disclosure are described above. It should be understood that the present disclosure is not limited to the above specific implementations, and a person skilled in the art can make various variations or modifications within the scope of the claims without affecting the essence of the present disclosure. The embodiments of the present disclosure and features in the embodiments may be arbitrarily combined with each other in a non-conflicting situation.

What is claimed is:

1. A coal flow identification method based on a background subtraction algorithm, comprising:

S1: simultaneously capturing images of a coal layer at a coal unloading end of a scraper conveyor using a plurality of cameras mounted on a reversed loader in parallel;

S2: determining an optimal sequence image of simultaneously captured three sequence images, and delimiting a region of interest;

S3: extracting a motion region outline in the image;

S4: performing line adding repair on the motion region outline, and padding the repaired motion region outline;

S5: calculating a number of pixels in a motion region, and calculating an area of the motion region according to a scale; and S6: calculating a coal flow volume.

2. The coal flow identification method according to claim 1, wherein in step S1, three cameras are mounted in parallel on a sidewall of the coal unloading end of the scraper conveyor, and angles of the cameras are adjusted such that the cameras are located above a horizontal plane of the coal layer of the scraper conveyor.

3. The coal flow identification method according to claim 1, wherein step S2 comprises:

S21: selecting an image of an ideal location area at the coal unloading end of the scraper conveyor as a predefined template t[m,n];

S22: calculating similarities of images $G_1[x,y]$, $G_2[x,y]$, and $G_3[x,y]$ captured by three cameras at a same time with the predefined template t[m, n] to obtain and output a similarity matrix R[x−m+1, y−n+1], and S23: segmenting a region having a maximum similarity in the three images or a region represented by a point of a maximum of the similarity matrix, and setting the region as the region of interest.

4. The coal flow identification method according to claim 1, wherein step S3 comprises:

S31: performing edge recognition on an image of the region of interest extracted in S2;

S32: performing a subtraction operation on a current image frame and a background mask, and delimiting the motion region outline; and S33: performing the subtraction operation on the delimited motion region outline of a current frame and the current image frame to obtain a new background mask, wherein the new background mask is used for delimiting the motion region outline in next image frame.

5. The coal flow identification method according to claim 1, wherein step S4 comprises:

S41: with a few of noisy points existing outside the motion region outline delimited in S3, performing Gaussian filtering and median filtering on the image;

S42: performing broken line repair on a motion region image in case that the processed motion region outline has a broken outline; and S43: padding an interior of the motion region outline, wherein a padded region represents a cross-sectional area of the current image frame of a coal material.

6. The coal flow identification method according to claim 1, wherein step S5 comprises:

S51: selecting a scraper on the scraper conveyor in a no-load state as a reference object, measuring a number Mc of pixels and an actual size Nc of the scraper, and calculating a scale $$Kc = \frac{Nc}{Mc};$$

S52: calculating a number of pixels of the motion region padded in S4; and

S53: converting the number of pixels to a real cross-sectional area according to the scale.

7. The coal flow identification method according to claim 6, wherein in step S52, an average value of numbers of pixels of motion regions of five consecutive image frames is used as the number of pixels of the motion region.

8. The coal flow identification method according to claim 1, wherein step S6 comprises:

S61: calculating an instantaneous chain speed according to an instantaneous speed and a radius of a chain sprocket of the scraper conveyor;

S62: calculating an instantaneous coal flow volume according to the instantaneous chain speed; and S63: calculating a coal flow volume within an hour according to the instantaneous coal flow volume.

9. The coal flow identification method according to claim 8, wherein in step S61, a speed value of a head sprocket of the scraper conveyor at an ith second is averagely divided into six segments, which correspond to numbers of pixels of six motion regions within the ith second, denoted by $\omega_{i1}$, $\omega_{i2}$, $\omega_{i3}$, $\omega_{i4}$, $\omega_{i5}$, and $\omega_{i6}$; the radius of the sprocket is denoted by r; the instantaneous chain speed is denoted by $qi=\omega_i \times r$; and chain speeds at the ith second are denoted by $q_{i1}$, $q_{i2}$, $q_{i3}$, $q_{i4}$, $q_{i5}$, and $q_{i6}$.

10. The coal flow identification method according to claim 8, wherein in step S62, the instantaneous coal flow volume is denoted by $$V_i = \frac{1}{6} Kc \sum_{j=1}^{6} N_{ij} q_{ij},$$

wherein Vi represents a coal flow volume at an ith second; Kc represents the scale; and $N_{ij}$ and $q_{ij}$ represent a number j of pixels and a chain speed j at the ith second, respectively; and in step S63, the coal flow volume within an hour is denoted by $$V_{1h} = \sum_{i=1}^{3600} V_i - V_C,$$

wherein Vi represents the coal flow volume at the ith second; and Vc represents a no-load volume in an hour.

* * * * *